Oct. 11, 1960 C. F. KRAMER 2,955,644
AUTOMOBILE SEAT CONSTRUCTION
Filed April 24, 1956 4 Sheets-Sheet 1

C.F. KRAMER
*INVENTOR.*

BY E. C. McRae
J. B. Faulkner
T. H. Oster

ATTORNEYS

Oct. 11, 1960 C. F. KRAMER 2,955,644
AUTOMOBILE SEAT CONSTRUCTION
Filed April 24, 1956 4 Sheets-Sheet 2
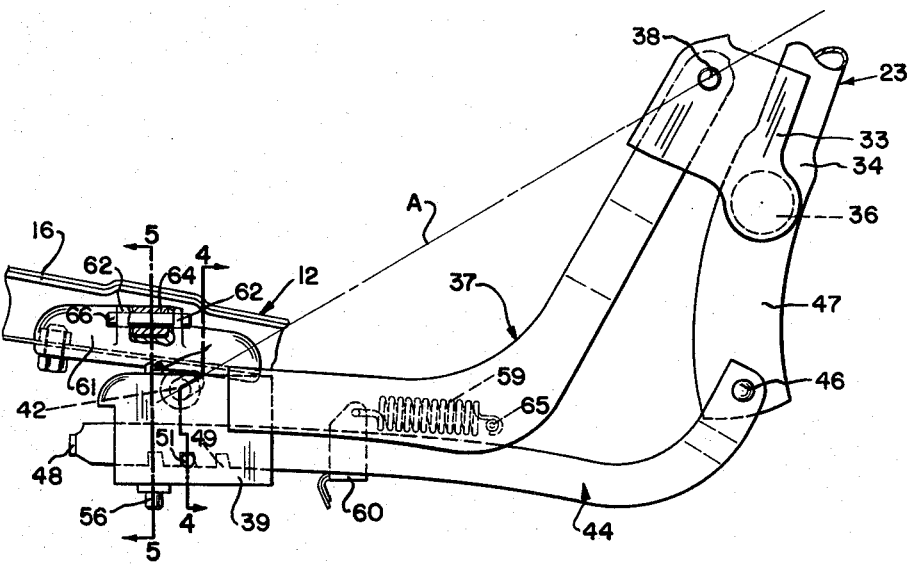
FIG. 3
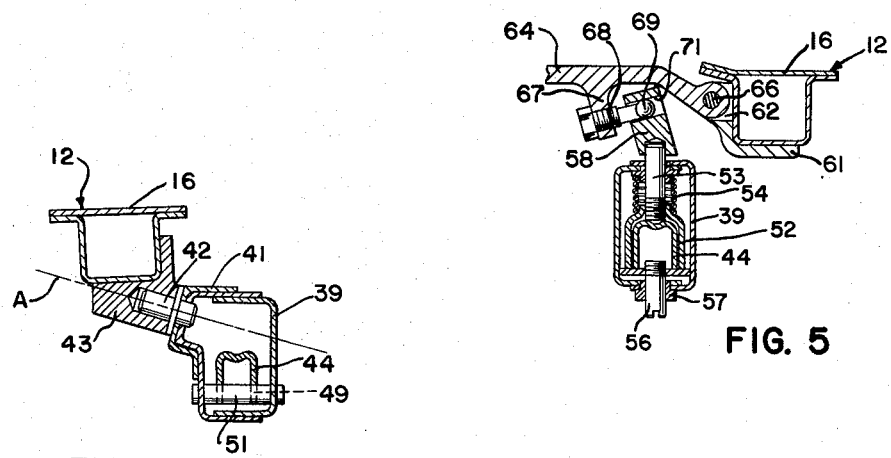
FIG. 4
FIG. 5
C.F. KRAMER
INVENTOR.
BY E. C. McRae
J. R. Faulkner
F. H. Oster
ATTORNEYS Oct. 11, 1960 C. F. KRAMER 2,955,644
AUTOMOBILE SEAT CONSTRUCTION
Filed April 24, 1956 4 Sheets-Sheet 3
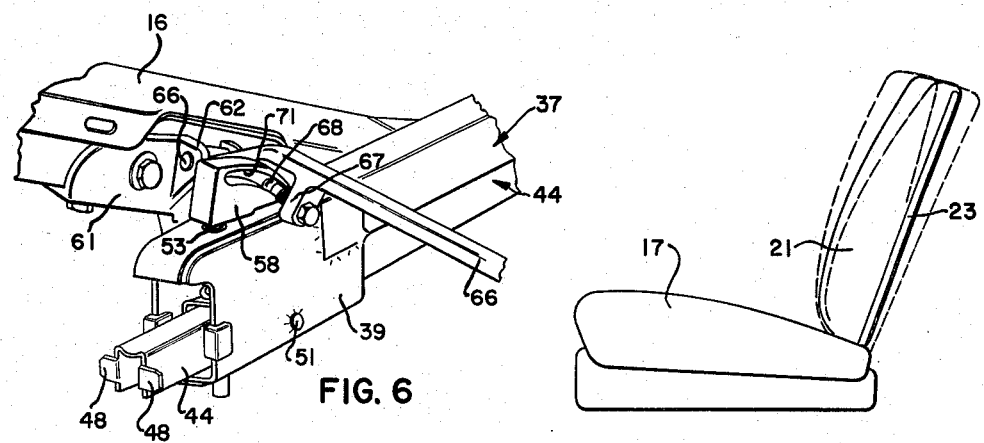
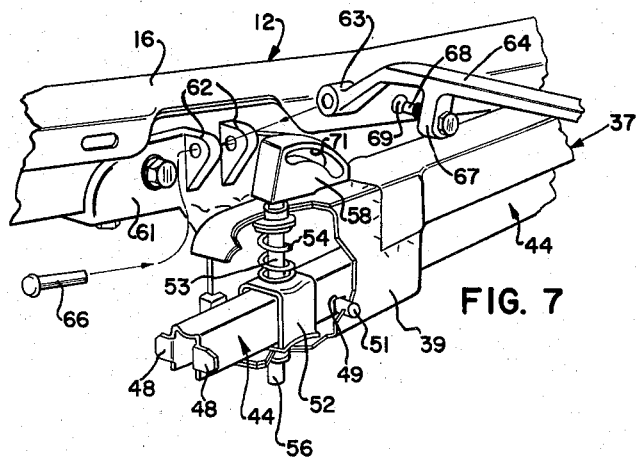
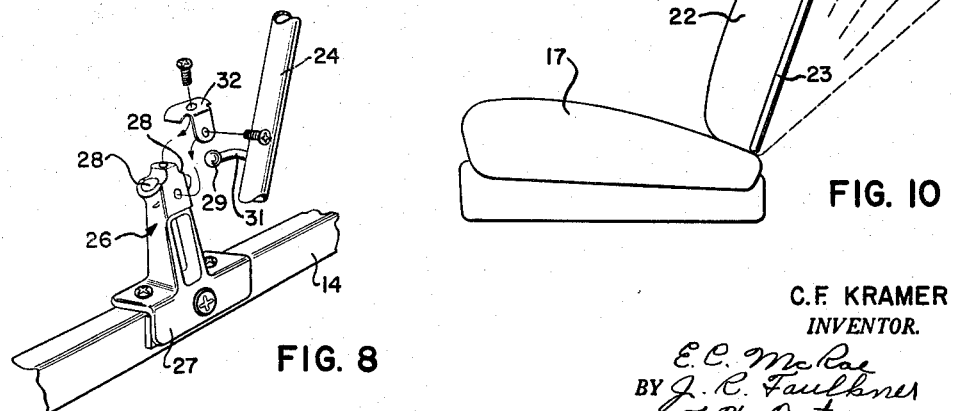
C. F. KRAMER
INVENTOR.
BY E. C. McRae
J. R. Faulkner
T. H. Oster
ATTORNEYS Oct. 11, 1960

C. F. KRAMER 2,955,644

AUTOMOBILE SEAT CONSTRUCTION

Filed April 24, 1956

C. F. KRAMER
*INVENTOR.*

BY E.C. McRae
J.R. Faulkner
F.H. Oster

ATTORNEYS

United States Patent Office 2,955,644
Patented Oct. 11, 1960

2,955,644

AUTOMOBILE SEAT CONSTRUCTION

Clarence F. Kramer, Birmingham, Mich., assignor to Ford Motor Company, Dearborn, Mich., a corporation of Delaware Filed Apr. 24, 1956, Ser. No. 580,315

12 Claims. (Cl. 155—5)

This invention relates generally to a seat construction, and particularly to an automobile front seat construction having a tiltable seat back.

It is known in the prior art to pivotally mount the seat back of the front seat of a motor vehicle of the two door type for tilting movement about an axis extending from an intermediate point on the side of the front seat in a direction upwardly and rearwardly toward the center of the vehicle body so that the seat may be tilted forwardly and inwardly to provide maximum clearance for ingress and egress for passengers entering the rear seat of the vehicle through the single side door. This construction is shown in the patent to Galamb et al., 2,132,729, and is currently in use upon the majority of automobiles produced today.

It is an object of the present invention to provide a seat construction for a motor vehicle in which the seat back of the front seat may be tilted forwardly and inwardly in the manner of the prior art mentioned above, and which may also be tilted about a transverse horizontal axis to provide optimum comfort for the occupant. In an embodiment of the invention the front seat is formed with independently operable seat backs. One of the seat backs extends for approximately one-third the width of the seat and accommodates the driver, while the other seat back extends the other two-thirds of the seat and accommodates the two passengers which may share the front seat with the driver. Each of the seat backs is pivotally connected at its inboard edge to a bracket extending upwardly from the seat frame. Each of the seat backs is pivotally connected adjacent its outboard edge to an arm forming an extension of the seat back frame. The arm in turn is pivotally connected to the seat frame adjacent an intermediate portion of its side edge for pivotal movement about an axis extending upwardly and rearwardly therefrom and passing through the pivotal connection between the inboard edge of the seat back and the frame bracket. The pivotal connection between the seat back frame and the extension arm is substantially in horizontal transverse alignment with the pivotal connection between the inboard edge of the seat back frame and the frame bracket. A connecting element or link extends between the seat back frame and the extension arm and is adjustable to vary the angular relationship between the seat back frame and the arm. This enables the seat back frame to be tilted forwardly or rearwardly about a transverse horizontal axis to provide a plurality of positions for the seat back to attain individual occupant comfort, while at the same time permitting the forward and inward tilting of the seat back for access to the rear seat.

It is a further object of the invention to provide a seat construction performing the functions mentioned above, which is simple and inexpensive to manufacture, and which is readily adaptable to current conventional front seat construction.

A further object of the invention is to provide convenient and easily operated means for tilting the seat back about the transverse horizontal axis without interfering with the forward and inward tilting of the seat back about the inclined axis.

Other objects and advantages of this invention will be made more apparent as this description proceeds, particularly when considered in connection with the accompanying drawings, wherein:

Figure 3 is an enlarged fragmentary side elevational view, partly broken away and in section, of the construction shown in Figure 1.

Figures 4 and 5 are transverse cross sectional views taken on the lines 4—4 and 5—5 of Figure 3.

Figure 6 is an enlarged perspective view of the manual operating means for tilting the seat back about a transverse horizontal axis.

Figure 7 is an exploded perspective view of the structure shown in Figure 6.

Figure 8 is an exploded perspective view of one of the pivot mountings of the seat back.

Figure 9 is a diagrammatic side elevational view of the front seat, showing the tilting movement of the seat back at the driver's side.

Figure 10 is a view similar to Figure 9 showing the adjustment of the seat back at the passenger's side.

Figure 11:
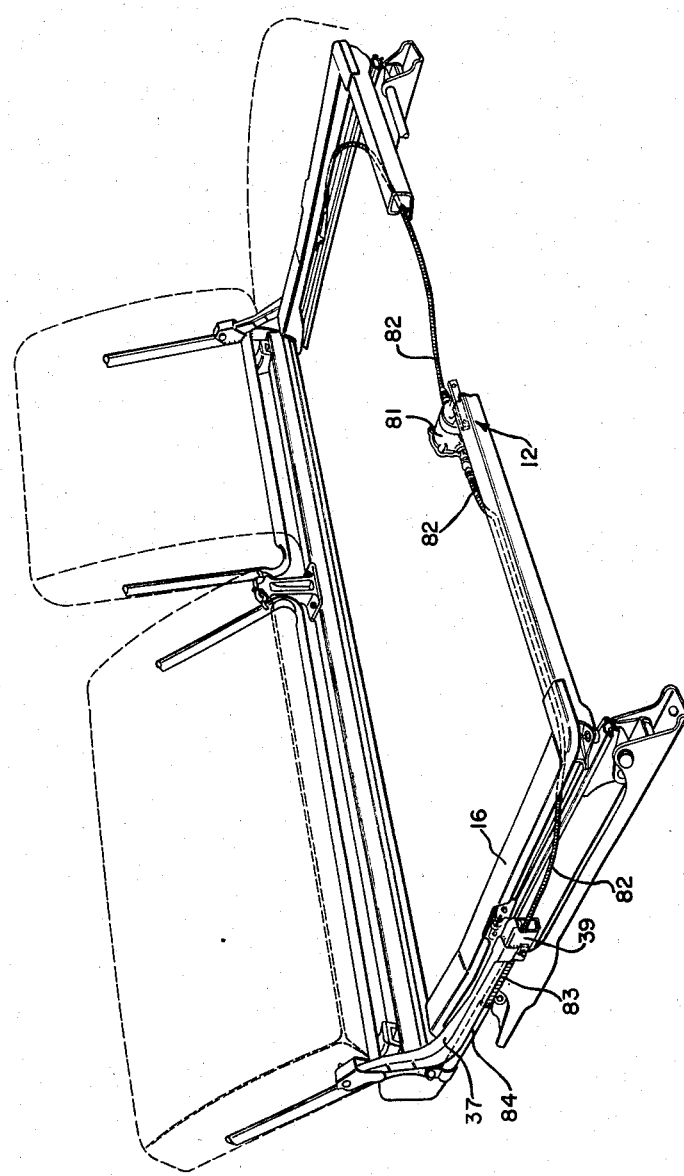

Figure 11 is a perspective view of a modification of the invention.

Figure 1:
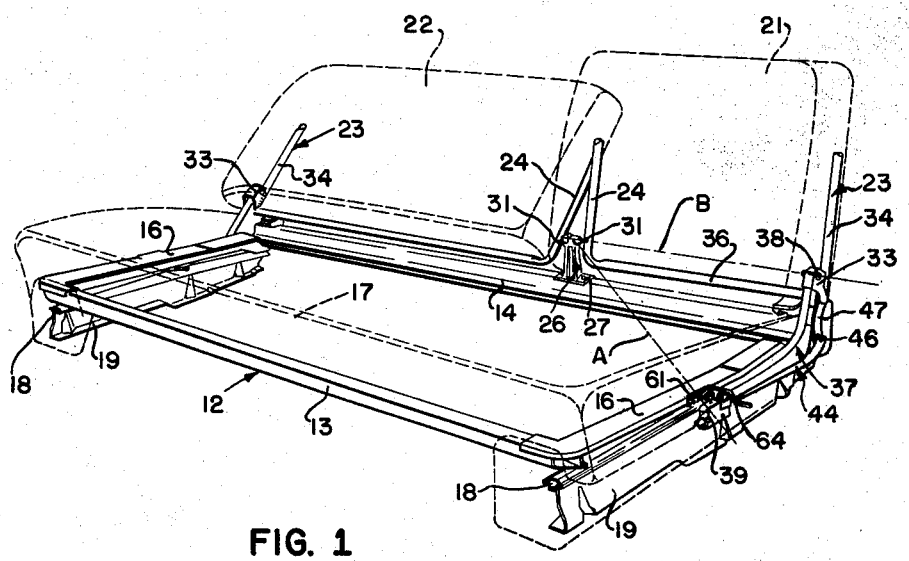
Figure 1 is a perspective view of the front seat of an automobile incorporating the present invention.
Figure 2:
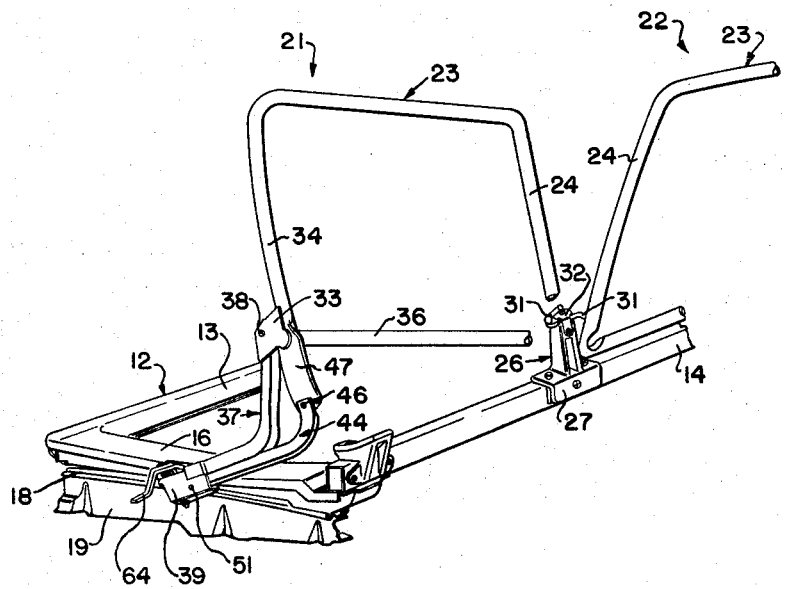
Figure 2 is a fragmentary perspective view of a portion of the structure shown in Figure 1, with the seat back at the driver's side tilted forwardly and inwardly.

Referring now particularly to Figures 1, 2 and 3, there is shown a seat frame 12 having front and rear transversely extending frame members 13 and 14, and side frame members 16. A seat cushion shown in dotted lines at 17 is mounted upon the seat frame. The seat frame is conventionally mounted upon longitudinally extending seat track assemblies 18 which in turn are supported upon floor brackets 19 to permit fore and aft adjustment of the entire seat according to driver perference.

This seat is particularly designed for use in connection with an automobile of the two door type in which access to the rear passenger compartment must be gained through a single door at each side of the vehicle body, with the door being located adjacent the front seat. Conventionally this is accomplished by providing a split seat back in which either the seat back at the driver's side or at the passenger's side may be tilted forwardly and inwardly to provide additional clearance for entrance to the rear seat. In the present instance the seat back is divided in such manner as to form a seat back 21 at the driver's side occupying approximately one-third of the width of the seat, and a seat back 22 at the passenger's side occupying approximately two-thirds of the width of the seat and arranged to accommodate two front seat passengers. Each of the seat backs is generally similar in construction and in mounting with the exception of the variation in the width, and accordingly only the driver's seat back 21 will be described in detail.

Each seat back is provided with a tubular peripheral frame 23 upon which the seat cushion is mounted. As best shown in Figures 1, 2 and 8, the adjacent inboard portions 24 of the seat backs 21 and 22 are pivotally mounted upon a bracket 26 having an L-shaped base 27 fastened to the rear transverse rail 14 of the seat frame 12.

Adjacent its upper end the frame bracket 26 is formed with a pair of semispherical sockets 28 adapted to receive the ball shaped ends 29 of arms 31 secured to the lower portions of the inboard portions 24 of the seat back frames. A retaining plate 32 is secured to the top of the bracket 26 and retains the balls 29 in their sockets, It will be seen that the two seat backs are mounted for universal movement about the ball joints formed by the balls 29 and socket 28.

Referring now particularly to Figures 1, 2, 3 and also 6 and 7, it will be seen that a U-shaped bracket 33 is welded to each of the seat back frames 23. The brackets 33 are U-shaped and straddle the side members 34 of the seat back frames and are welded thereto at the juncture between the side members 34 and the lower members 36 of the seat back frames.

An arm 37, channel shaped in cross section and L-shaped in side elevation, is embraced at its upper end by the U-shaped bracket 33 and is pivotally connected thereto by means of a pivot pin 38. The arm 37 forms an extension of the side member 34 of the seat back frame and its lower leg extends along the side of the seat frame 12 for pivotal connection thereto. At its forward end the arm 37 is welded to a box section housing 39 formed of two sheet metal sections welded together as best shown in Figure 4. As seen in Figure 4, the housing 39 is reinforced by a plate 41 carrying a pivot pin 42 having a pivotal connection with a bracket 43 depending from and secured to the box section side frame member 16 of the seat frame 12.

It will be apparent that the housing 39 at the forward end of the arm 37 is thus mounted upon the seat frame for pivotal movement about an axis A. The axis A is so positioned as to extend from the pivot pin 42 in a direction upwardly and rearwardly toward the center of the vehicle body, and to extend through the ball joint connection 28—29 between the frame bracket 26 and the inboard frame member 24 of the seat back.

It has previously been mentioned that the side frame member 34 of the seat back frame 23 is pivotally connected to the arm 37 by the pivot pin 38. The angular relationship between these two pivotally interconnected members is controlled by a link 44. The link 44 extends longitudinally in substantially vertical alignment with the arm 37, and is channel shaped in cross section. At its rearward end the link 44 is pivotally connected by means of a pivot pin 46 to the depending portion 47 of the side frame 34 of the seat back frame. The forward portion of the link 44 extends within the lower leg of the channel shaped arm 37 and through the box section housing 39 carried by the forward end of the arm 37. At its extreme forward end the link 44 is formed with tabs 48 engageable with the sides of the housing 39 to limit rearward movement of the link relative thereto.

Means are provided for adjustably securing the link 44 in a plurality of longitudinally adjusted positions relative to the housing 39. The side flanges of the link 44 are formed with a plurality of spaced notches 49 engageable with a pin 51 carried by the housing 39 and extending between the side walls thereof. A yoke 52 embraces the forward end of the link 44 and is secured at the lower end of a rod 53 extending through the upper end of the housing for manual operation. A spring 54 normally urges the yoke downwardly. A pilot pin 56 is secured to the lower wall of the yoke and passes through a bushing 57 in the lower wall of the housing to pilot the yoke. A cam member 58 is secured to the upper end of the pin 53. It will be apparent that lifting of the cam member 58 raises the yoke 52 attached thereto and consequently lifts the link 44 out of engagement with the cross pin 51 to permit the link to be adjusted longitudinally and repositioned with a different notch 49 thereof engaging the pin 51. A coil spring 59 secured between a bracket 60 carried by the link 44 and a pin 65 carried by the arm 37 urges the link 44 rearwardly with respect to the arm 37.

Manual means are provided for operating the yoke 52 to permit adjustment of the link 44 relative to the arm 37. An L-shaped bracket 61 is bolted to the side frame member 16 of the seat frame 12 and is formed with a pair of projecting ears 62. The ears 62 embrace the apertured end 63 of a manually operated lever 64, a pin 66 completing the pivotal connection therebetween. Intermediate its ends the manually operated arm 64 is formed with a downwardly depending flange 67 carrying a stud 68 having a ball 69 at its inner end. The ball 69 is received within a cam slot 71 formed in the cam bracket 58 connected to the yoke 52. The cam bracket 58 is inclined and is arranged in a plane at right angles to the axis A while the cam slot 71 is formed on an arc whose center is the axis A.

The operation of the seat is as follows: With the link 44 held by the pin 51 and slot 49 connection in a fixed adjusted position relative to the arm 37, it will be seen that the seat back frame 23 is angularly positioned with respect to the arm 37 in a predetermined manner. Consequently, the entire seat back may be tilted forwardly and inwardly about the axis A, which extends from the pivot pin connection 42 between the forward end of the arm 37 and the side frame member 16 and extends upwardly and rearwardly toward the center of the vehicle body, passing through the ball joint connection 29—31 at the inboard side of the seat back frame. The seat back may thus be tilted forwardly and inwardly to provide convenient access to the rear seat compartment of the vehicle. Since the cam slot 71 in the member 58 is arranged arcuately with respect to the axis A, the ball 69 at the stud 68 carried by the manually operated handle 64 rides in the cam slot as the seat back is tilted inwardly and forwardly, without interference.

When it is desired to tilt the seat back forwardly or rearwardly for optimum occupant comfort, this can be readily accomplished by lifting the manually operated handle 64, which lifts the member 58 and the interconnected yoke 52, raising the forward end of the link 44 until the connection between the slot 49 and pin 51 is disengaged. The seat back may then be manually grasped and tilted either forwardly or rearwardly about the axis B which extends transversely and horizontally between the ball joint connection 29—31 at the inboard side of the seat frame and the pivot pin 38 at the outboard side of the seat back frame between the seat back side frame member 39 and the arm 37. When the proper adjusted tilted position is obtained the handle 64 may be released and the spring 54 will urge the forward end of the link 44 downwardly re-establishing interlocking connection between a different notch 49 and the pin 51.

As seen in Figure 9, the driver's seat back 21 may be adjusted forwardly and rearwardly between the positions shown in dotted lines to achieve maximum driver comfort. With respect to the seat back 22 at the passenger's side, this seat back is arranged for additional tilting movement through the positions shown in dotted lines in Figure 10 to enable the passengers to assume comfortable reclined positions. The additional tilting of the passenger's seat back is accomplished by providing suitably arranged notches along the adjacent links 44 to accommodate the desired adjustment.

From the foregoing it will be seen that the two front seat backs may be individually tilted about inclined axes to provide access to the passenger compartment, and in addition may be individually tilted about transverse horizontal axes to tilt the seat backs for maximum driver and passenger comfort. It will also be noted that the tilting of the seat back about the inclined axis may be accomplished regardless of the adjusted tilted position of the seat back about the transverse horizontal axis B, and that the construction is such as to permit the two tilting movements to be affected by the same mechanism.

Referring now to the modification shown in Figure 11, there is shown a seat construction similar to that shown in Figures 1 to 10 inclusive except that the tilting movement of the seat backs about the horizontal transverse axis is effected by power means rather than by manual means. A motor 81 is mounted upon the seat frame 12 and is provided with flexible cables 82 extending in opposite directions therefrom. The cables 82 generally follow the contour of the seat frame and are bent rearwardly along the side seat frame members 16 and extend into the box section housings 39 carried at the forward ends of the arms 37. The end of each flexible cable 82 is secured to a threaded member 83 threadedly received within an internally tapped tube 84 taking the place of and occupying the same position as the link 44 of the manual construction.

It will be apparent from this modified arrangement that the seat backs may be tilted about the transverse horizontal axes B by power means. If desired, separate motors may be provided to permit the seat backs to be individually adjusted. Alternatively, clutch means may be incorporated in the flexible cables 82 to enable the motor 81 to selectively drive either of the cables to tilt either of the seat backs as desired.

It will be understood that the invention is not to be limited to the exact construction shown and described, but that various changes and modifications may be made without departing from the spirit and scope of the invention, as defined in the appended claims.

What is claimed is:

1. An automobile body construction characterized by its having front and rear seats therein and having a single door at one side thereof, said door being longitudinally positioned in alignment with said front seat, a transversely extending seat back positioned adjacent the rear edge of said front seat and having a frame, means pivotally mounting the inboard edge of said seat back frame upon said seat, a member pivotally connected to the outboard edge of said seat back frame and pivotally connected to an intermediate portion of the side edge of said front seat to form with the pivotal connection at the inboard edge of said seat back frame an axis extending upwardly and rearwardly toward the center of said body, and interconnecting means between said seat back frame and said member.

2. The structure defined by claim 1 which is further characterized in that said interconnecting means comprises an element having connections with said member and with said seat back frame, one of said connections being adjustable to tilt said seat back about a transversely extending axis extending between the pivotal connection at the inboard edge of said seat back and the pivotal connection between the outboard edge of said seat back frame and said member.

3. The structure defined by claim 2 which is further characterized in that said element comprises a longitudinally extending link pivotally connected at its rearward end to said seat back frame at a point spaced from the pivotal connection between said seat back frame and said member, said link being adjustably connected at its forward end to said member for longitudinal adjustment with respect thereto.

4. The structure defined by claim 1 which is further characterized in that the pivotal connection between the inboard edge of said seat back frame and said seat comprises a universal joint.

5. An automobile seat construction comprising a front seat frame extending transversely of said automobile, a bracket mounted upon the rearward portion of said seat frame intermediate the sides thereof and extending upwardly therefrom, a seat back frame positioned adjacent the rear edge of said seat frame and pivotally connected at its inboard edge to said bracket, a member pivotally connected to the outboard edge of said seat back frame and forming an extension thereof projecting forwardly along the outboard edge of said seat frame, the last mentioned pivotal connection being in substantially transverse horizontal alignment with the pivotal connection between the inboard edge of said seat back frame and said bracket, means pivotally connecting said member to said seat frame at a point located beneath and forwardly of the pivotal connection between said seat back frame and said bracket to form a first pivot axis for swinging said seat back frame forwardly and inwardly of said automobile, and means for varying the angular relationship between said seat back frame and said member to tilt said seat back frame about a second generally transversely extending pivot axis to the first and second mentioned pivotal connections, said second pivot axis intersecting but inclined with respect to said first pivot axis.

6. The structure defined by claim 5 which is further characterized in that said seat back frame and said member are interconnected by an adjustable link to vary the angular relationship between said seat back frame and said member.

7. The structure defined by claim 5 which is further characterized in that a link is mounted upon said member for longitudinal adjustment relative thereto, said link being connected at its rearward end to a part of said seat back frame spaced vertically from the pivotal connection between said seat back frame and said member.

8. The structure defined by claim 7 which is further characterized in that the forward end of said link is slidably embraced by the forward portion of said member, said link and said member having longitudinally spaced cooperating index means for securing said link and said member in a plurality of longitudinally adjusted positions, and a manual operating lever connected to the forward portion of said link to disengage said index means and permit longitudinal adjustment of said link relative to said member.

9. The structure defined by claim 8 which is further characterized in that said manually operated lever is pivotally connected to the side portion of said seat frame and extends laterally outwardly therefrom, and a lost-motion connection between said lever and the forward portion of said link to accommodate forward and inward pivotal movement of said seat back frame about said first mentioned inclined axis.

10. A motor vehicle body construction characterized by having front and rear seats therein having a single door in one side thereof, the door being longitudinally positioned in alignment with said front seat, said seat having a frame, a seat back frame positioned adjacent the rear edge of said seat frame and having a universal connection at its inboard edge with said seat frame, an arm pivotally connected to the outboard edge of said seat back frame in transverse horizontal alignment with the universal connection between the inboard edge of said seat back frame, and said seat frame, said arm extending downwardly and forwardly along the outer edge of said seat frame and pivotally connected at its forward end to said seat frame about an inclined axis passing through the pivotal connection between the inboard edge of said seat back frame and said seat frame, and a link mounted upon said arm and longitudinally adjusted with respect thereto, said link having a pivotal connection at its rearward end to the outboard edge of said seat back frame at a point spaced vertically beneath the pivotal connection between said seat back frame and said arm, and means for adjusting said link longitudinally of said arm between a plurality of adjusted positions to tilt said seat back about a horizontal transverse axis while permitting forward and inward pivotal movement of said seat back frame about an inclined axis extending rearwardly and upwardly toward the center of said vehicle from the forward portion of said arm.

11. An automobile body construction characterized by its having front and rear seats therein and having a single door at one side thereof, said door being longitudinally positioned in alignment with said front seat, a seat back positioned adjacent the rear edge of said front seat, a first means hingedly supporting said seat back on said front seat to swing about a first axis which extends from an intermediate portion of the side edge of said front seat upwardly and rearwardly toward the center of said body, and a second means supporting said seat back for tilting movement about a second substantially horizontal axis extending transversely of said body, said first and second means including a common pivot means supporting the inboard end of said seat back, said first and second axes intersecting at said common pivot means.

12. An automobile body construction characterized by its having front and rear seats therein and having a single door at one side thereof, said door being longitudinally positioned in alignment with said front seat, a seat back positioned adjacent the rear edge of said front seat, a first means hingedly supporting said seat back on said front seat to swing about a first axis which extends from an intermediate portion of the side edge of said front seat upwardly and rearwardly toward the center of said body, a second means supporting said seat back for tilting movement about a second substantially horizontal axis extending transversely of said body, said first and second means including a common pivot means supporting the inboard end of said seat back, said first and second axes intersecting at said common pivot means, and means operative to hold said seat back in selected tilted positions about said second axis.

References Cited in the file of this patent
UNITED STATES PATENTS

| | | |
|---|---|---|
| 1,957,004 | Smith | May 1, 1934 |
| 2,132,729 | Galamb et al. | Oct. 11, 1938 |
| 2,399,563 | Neely | Apr. 30, 1946 |
| 2,627,894 | Herider et al. | Feb. 10, 1953 |
| 2,799,325 | Wubbe | July 16, 1957 |

FOREIGN PATENTS

| | | |
|---|---|---|
| 703,111 | France | Feb. 2, 1931 |
| 848,742 | France | July 31, 1939 |